(12) United States Patent
Buhl et al.

(10) Patent No.: US 7,165,909 B2
(45) Date of Patent: Jan. 23, 2007

(54) ELASTIC CHASSIS BEARING FOR UTILITY VEHICLES

(75) Inventors: Manfred Buhl, Bissendorf (DE); Ralf Kunze, Bad Essen (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 11/060,698

(22) Filed: Feb. 17, 2005

(65) Prior Publication Data
US 2005/0153781 A1 Jul. 14, 2005

Related U.S. Application Data

(63) Continuation of application No. PCT/DE03/04126, filed on Dec. 15, 2003.

(30) Foreign Application Priority Data
Dec. 16, 2002 (DE) .............................. 102 58 986

(51) Int. Cl.
*F16C 11/00* (2006.01)
(52) U.S. Cl. ........................ 403/132; 403/135
(58) Field of Classification Search ................ 403/132, 403/133, 135, 225, 228; 267/294; 248/635; 464/89
See application file for complete search history.

(56) References Cited

U.S. PATENT DOCUMENTS 2,509,141 A * 5/1950 Freel ....................... 403/228 X
2,689,755 A * 9/1954 Krotz
3,666,301 A * 5/1972 Jorn .............................. 403/228
4,158,511 A * 6/1979 Herbenar ................ 403/228 X
4,327,995 A * 5/1982 Stewart
4,349,184 A * 9/1982 Peterson et al.
5,286,132 A * 2/1994 Morini ......................... 403/228
5,846,014 A * 12/1998 Arthur et al.

FOREIGN PATENT DOCUMENTS

| DE | 690476 | 4/1940 |
|----|--------|--------|
| DE | 38 24 272 A1 | 3/1990 |
| DE | 40 11 962 A1 | 10/1990 |

(Continued)

OTHER PUBLICATIONS

Webster's Dictionary: Full Text [online] 3rd ed., Merriam-Webster, Inc., 1993 [retrieved Dec. 8, 2005]. Retrieved from the Internet: URL http://lionreference.chadwyck.com.*

*Primary Examiner*—Greg Binda
(74) *Attorney, Agent, or Firm*—McGlew & Tuttle, PC

(57) ABSTRACT

An elastic chassis bearing in utility vehicles is provided as a joint as such for the elastic mechanical connection of two machine parts especially in the construction of vehicles, having a claw (connection part) 1 and a housing (13, 14). The claw (1) has a middle area (4) and two end areas (2). The claw is a rotationally symmetrical turned part, and the housing (13, 14) includes at least two bushes 5, 6, 7; 7, 15 inserted concentrically one into another, which together define a hollow cylinder and an intermediate space (8, 9, 16). The intermediate space is filled with an elastic material, so that the claw 1 enclosed by the innermost bush 5, 15 is cardanically movable in relation to the bush 7 or the other bushes 6, 7 of the housing 13, 14.

7 Claims, 8 Drawing Sheets

FOREIGN PATENT DOCUMENTS

| | | |
|---|---|---|
| DE | 42 44 914 C2 | 9/1996 |
| DE | 199 06 855 A1 | 9/1999 |
| DE | 101 33 319 A1 | 2/2002 |
| DE | 101 16 053 A1 | 10/2002 |
| DE | 102 16 167 A1 | 10/2002 |
| EP | 0 461 492 A1 | 12/1991 |
| EP | 0 654 617 A1 | 5/1995 |
| EP | 1 092 891 A2 | 4/2001 |
| GB | 351196 | 6/1931 |
| GB | 354778 * | 8/1931 |
| GB | 2 231 120 A * | 11/1990 |
| GB | 2 364 558 A | 1/2002 |
| WO | WO 96/22896 | 8/1996 |
| WO | WO 01/55615 A1 | 8/2001 |

* cited by examiner

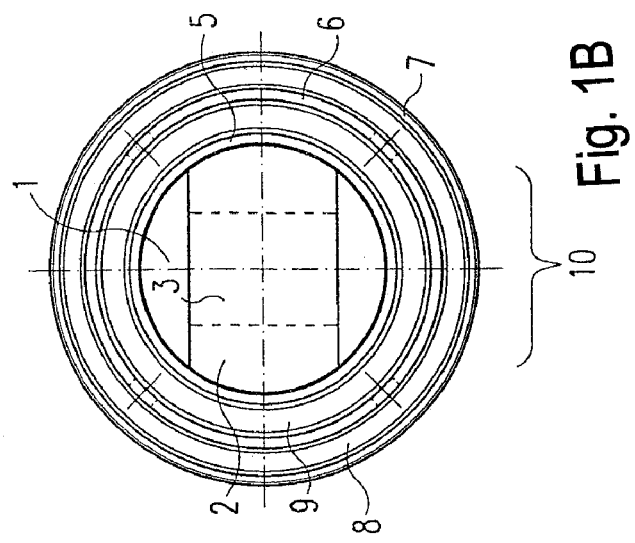
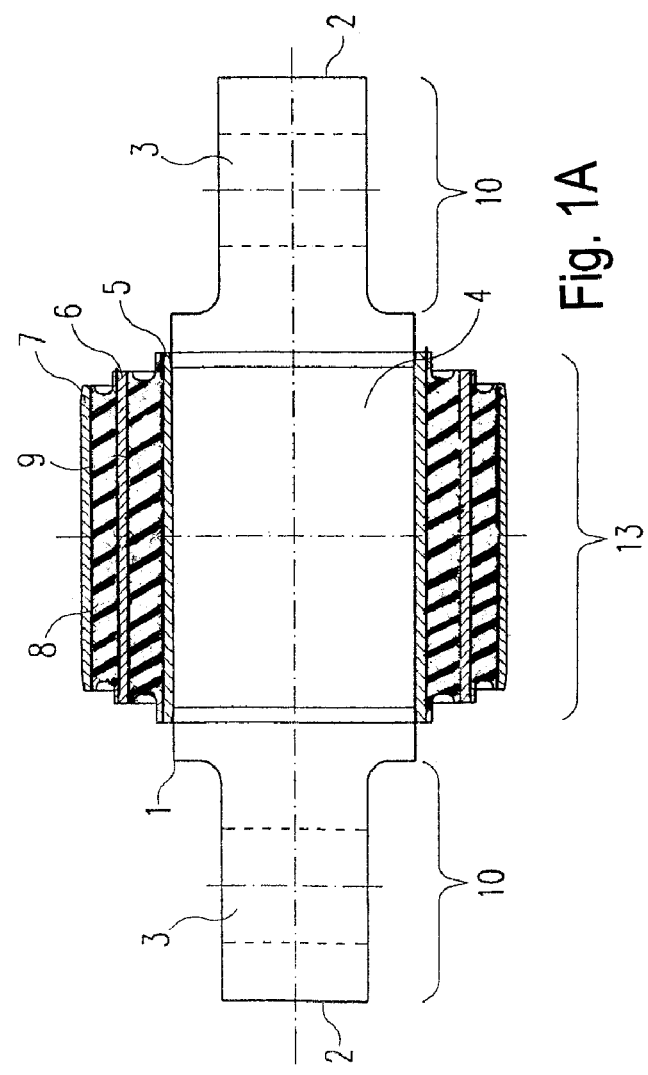

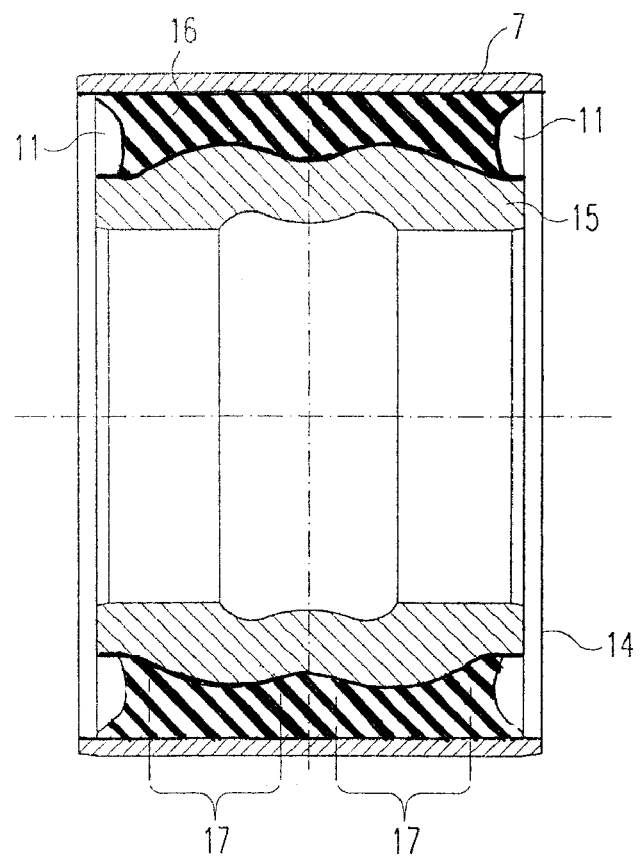
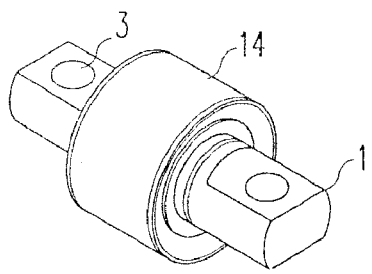
Fig. 6A

ELASTIC CHASSIS BEARING FOR UTILITY VEHICLES

CROSS REFERENCE TO RELATED APPLICATION

This is a continuation of and claims the benefit (35 U.S.C. § 120 and 365(c)) of copending International Application PCT/DE 2003/004126 of Dec. 15, 2003, which designated inter alia the United States and which claims the priority of German Application DE 102 58 986.0 of Dec. 16, 2002. The entire contents of each application is hereby incorporated by reference in its entirety.

FIELD OF THE INVENTION

The present invention pertains to a joint for elastically connecting two machine parts, especially in the construction of vehicles. The present invention pertains, in particular, to two variants of a joint, which has a claw and a housing, wherein the claw has a middle area, which is enclosed by the housing, and two end areas, to which one of the machine parts to be connected each is fastened.

BACKGROUND OF THE INVENTION

It is necessary in the construction of vehicles to couple all types of machine parts in an angularly movable manner. Such a mechanical connection is usually brought about by means of an elastic joint, in which a connection part, which may be spherical, among other things, and which connects the corresponding machine parts, is enclosed by a housing. The spherical part of the connection piece is mounted in the housing in an elastic intermediate layer. The housing itself is usually pressed into a bearing eye of a motor vehicle part. Such joints are maintenance-free because the mobility is achieved by the deformation of the elastic intermediate layer rather than by surfaces sliding on one another. Because of the spherical part of the connection piece, such a joint is called a "ball and socket joint."

Such a ball and socket joint—especially for pneumatic suspensions in utility vehicles—is disclosed in EP 1 092 891 A2. The ball and socket joint comprises two metallic halves (half shells), which are placed flatly against one another with their flat sides, and from which hemispherical or semi-ellipsoidal contours are stamped out in a cap-like manner in mutually opposite directions. The combination of these two halves yields a so-called ball piece in the middle and so-called connection pieces with holes or grooves for fixing the parts to be connected elastically by means of screw connections at both ends. One of these two halves, also called "claw," is shown in FIG. 8. The possibility of fastening mechanical parts to these halves explains the term "claw" used for such a part. The ball piece is inserted according to FIG. 7 into a cylindrical housing and is elastically connected with same via a joint body made of an elastic material (rubber), which is introduced by vulcanization. Both claws are rigidly connected with chassis and frame parts of the motor vehicle by means of the ends of the two halves, which jut out on both sides. Especially in an embodiment according to FIG. 7, the fastening is brought about by means of screws, which are introduced into the groove shown. The housing or the housings is/are usually integrated in struts and control arms, which elastically connect the corresponding chassis and frame parts.

In a ball piece designed as a rubber-metal part for mounting the chassis according to the state of the art just described, the corresponding half shells (claws with ball piece) must be manufactured for each length variant corresponding to the necessary length. This means, on the one hand, that a complete tool set is necessary for the manufacture for each variant. On the other hand, the particular manufacture of a length variant is complicated, especially because the forged part (stamped part) has so-called rigidity jumps because of its shape, which calls for a high-strength steel. Cutting of the half shells is not meaningful for cost reasons (time-consuming, large amount of waste, etc.).

SUMMARY OF THE INVENTION

The object of the present invention is therefore to provide a joint for the elastic mechanical connection of two machine parts, especially in the construction of vehicles, having a claw and a housing, wherein the claw has a middle area, which is enclosed by the housing, and two end areas, to which one of the machine parts to be connected each is fastened, which can be manufactured in a simple manner and can be used in a more flexible manner.

According to the invention, a joint for the elastic mechanical connection of two machine parts, especially in the construction of vehicles, is provided having a claw and a housing, wherein the claw has a middle area, which is enclosed by the housing, and two end areas, to which one of the machine parts to be connected is fastened. According to the present invention, the claw is a rotationally symmetrical turned part. The housing comprises at least two bushes, which are inserted concentrically into one another and together define a hollow cylinder, whose intermediate space is filled with an elastic material, so that the claw enclosed by the innermost bush is cardanically, torsionally as well as radially and axially movable in relation to the other bush or bushes of the housing.

Such a joint according to the present invention has the following advantages:

On the one hand, the external dimensions of such a housing (within one assembly unit) are always the same as a rubber-metal unit and can be correspondingly manufactured as a result for stocking.

On the other hand, a reduction of the claw to a simple turned part leads to simplified and therefore less expensive manufacture, the use of less expensive material (e.g., round steel not subjected to quenching and subsequent tempering), manufacture only shortly before mounting, and rapid formation of variants during mounting, e.g., in an automated process.

Furthermore, the variants are considerably reduced, which leads to facilitation and greater flexibility in stocking, as well as a reduction of the cost due to the elimination of variant-specific tool costs (e.g., forging dies) and thus on the whole, greater flexibility in manufacturing logistics.

The present invention is disclosed as two embodiments:

According to a first embodiment, the housing comprises three bushes inserted concentrically one into another. Each bush is advantageously cylindrical and represents a cylinder sleeve as such.

For functional efficiency, the middle cylinder sleeve advantageously has openings, through which the cavities between the inner and middle cylinder sleeves as well as between the middle and outer cylinder sleeves are connected. It is thus possible for the entire intermediate space between the innermost and outermost bushes to be able to be filled with an elastic material.

According to a second embodiment, the housing comprises two bushes, which can be concentrically inserted into one another.

The outer bush is advantageously cylindrical and represents a cylinder sleeve as such. The inner bush has two adjacent, outwardly directed spherical segment surfaces in the form of a double hump and represents a double ball sleeve as such.

The double ball sleeve simply represents a casting and can be manufactured at low cost, e.g., from spheroidal graphite cast iron.

The machine parts are fixed to the claw by means of holes in the area of the claw that is not enclosed. For reasons of better contact of the parts to be fixed, the claw is milled planarly transversely to the holes on both sides in the area of the claw that is not enclosed.

The manufacture of different assembly units of housings, which differ by different external diameters of the outer bushes, especially the outer bush, and therefore display different cardanic characteristics, is advantageously considered in both embodiments, As a result, a broader field of use of the particular joint is covered.

Furthermore, a process for manufacturing a housing for a joint according to the above claims is claimed according to the present invention, which process comprises the following steps:

(A) Concentric fixation of the bushes in a casting or vulcanizing mold, (B) injection of an elastic material into the intermediate space of the hollow cylinder generated by the arrangement of the bushes, and (C) generation of a pretension of the cooled elastic material.

The elastic material is advantageously pressed in on the front side.

According to the present invention, pretension as well as exact fitting for the housing to be pressed in are generated in the cooled elastic material by cold compression of the outer bush.

In case of a cylinder sleeve as the inner bush, the pretension of the cooled elastic material is further intensified and accurate fitting is generated for the claw to be pressed in by the cold widening of the innermost cylinder sleeve.

In case of a double ball sleeve as an inner bush, the double ball sleeve is subjected to mechanical finishing in order to produce an accurate fit for the claw to be pressed in.

Other features, properties and advantageous of the present invention will now be explained on the basis of exemplary embodiments and with reference to the accompanying drawing figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1A is a transverse cross sectional view of a first embodiment of the joint according to the present invention in the uninstalled state;

FIG. 1B is an axial view of the first embodiment of the joint according to the present invention in the uninstalled state;

FIG. 5 is a cross sectional view of the housing according to the present invention of the second embodiment before the calibration (widening and/or compression);

FIG. 6A is a perspective view of the second embodiment in the uninstalled state;

DESCRIPTION OF THE PREFERRED EMBODIMENTS

Figure 7:
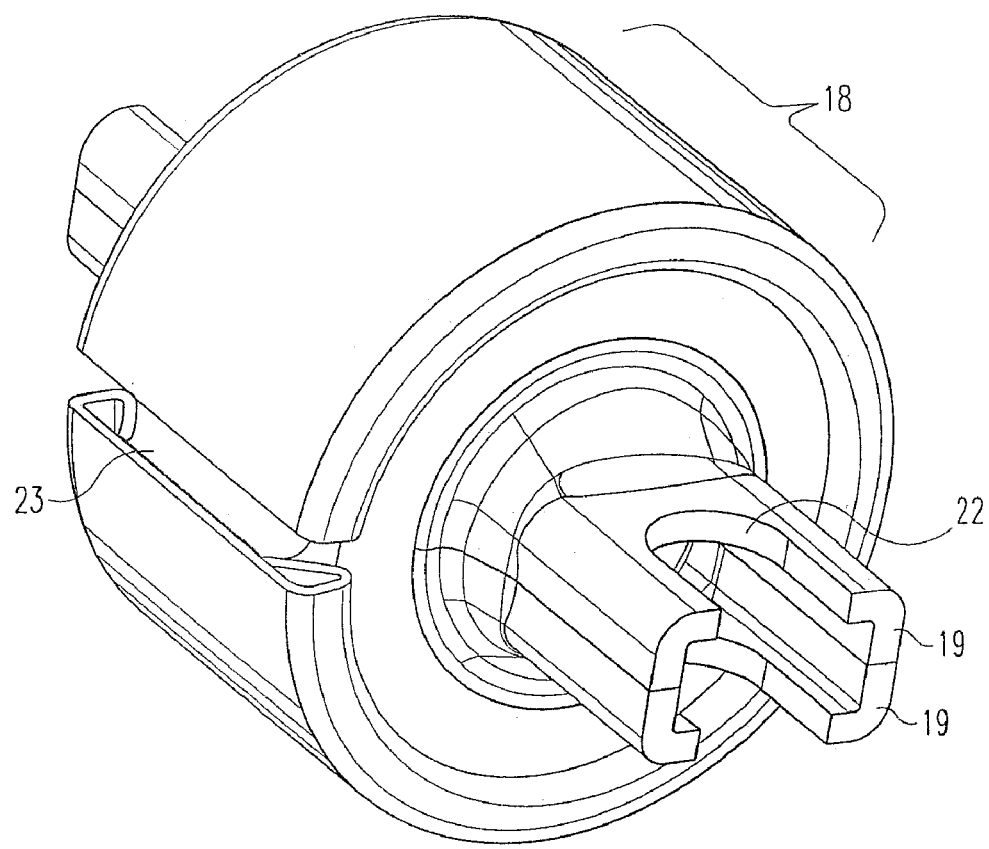
FIG. 7 is a perspective view of a joint according to the state of the art in the uninstalled state.
Figure 8:
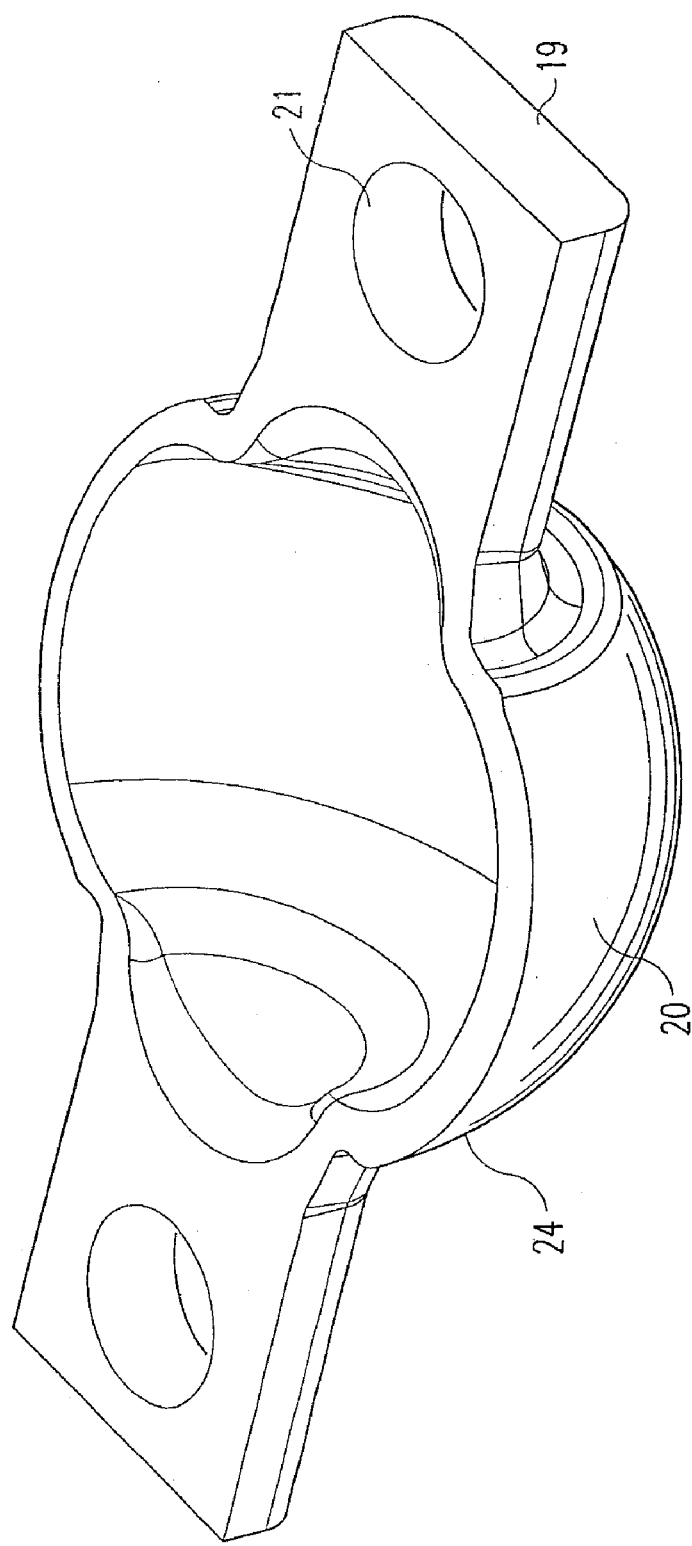
FIG. 8 is a perspective view of a half shell of the joint shown in FIG. 7.

The state of the art will be shown and explained on the basis of FIGS. 7 and 8.

FIG. 1A shows the transverse cross section with FIG. 1B showing the axial or end view of a first embodiment of the joint according to the present invention in the uninstalled state. The joint is essentially rotationally symmetrical and comprises a housing 13, into which a claw 1 or connection element is pressed centrally in a suitable fit 4. Compared with a joint according to the state of the art, the claw 1 has no spherical surfaces, and it will therefore hereinafter be called a cylinder piece 1. The name "ball and socket joint" used in the state of the art is also incorrect for the same reason in the case of this embodiment according to the present invention. The joint according to the present invention is therefore called a cylinder joint. In the area 2 in which it is not pressed in, the cylinder piece 1 has holes 3, which make it possible to screw down the parts that are to be elastically connected. To obtain a stabilizing contact or fastening surface, both sides are milled at one end each of the cylinder piece 10 transversely to the axis of the hole 3. The housing 13 comprises three cylinder sleeves 5, 6, 7 of different diameters, which are pushed one into another concentrically to define at least a hollow cylinder. In case of FIG. 1, the innermost cylinder sleeve 5 is longest, and the outer cylinder sleeve 7 is the shortest. The cylindrical intermediate spaces 8, 9 obtained because of the installation geometry are filled with an elastic material, preferably rubber (indicated by hatching). For functional efficiency (the manufacturing process will be discussed more thoroughly later), the middle cylinder sleeve 6 has holes 12 (openings), via which the interior space of the middle cylinder sleeve 9 is connected with the outer cylinder sleeve 8. The openings 12 have a diameter of several mm (approx. 5 mm) and may also be of an oval shape. Like the housing 18 of a joint according to the state of the art in FIG. 7, the outer cylinder sleeve 7 is pressed into a bearing eye of a stable vehicle part. The installation force needed for pressing in is approx. 60 kN±10 kN (kilonewton). The cylinder piece 1 thus has a cardanic suspension, via which the parts to be connected movably are flexibly coupled by means of the elasticity of the interior of the housing. Radial mobility and cardanic mobility, as well as axial mobility, are ensured with such a suspension by up to 12°. The maximum torsion of the cylinder joint is approx. 26°.

A cylinder joint according to the present invention requires a suitable manufacturing process, which will be briefly outlined below.

Figure 2:
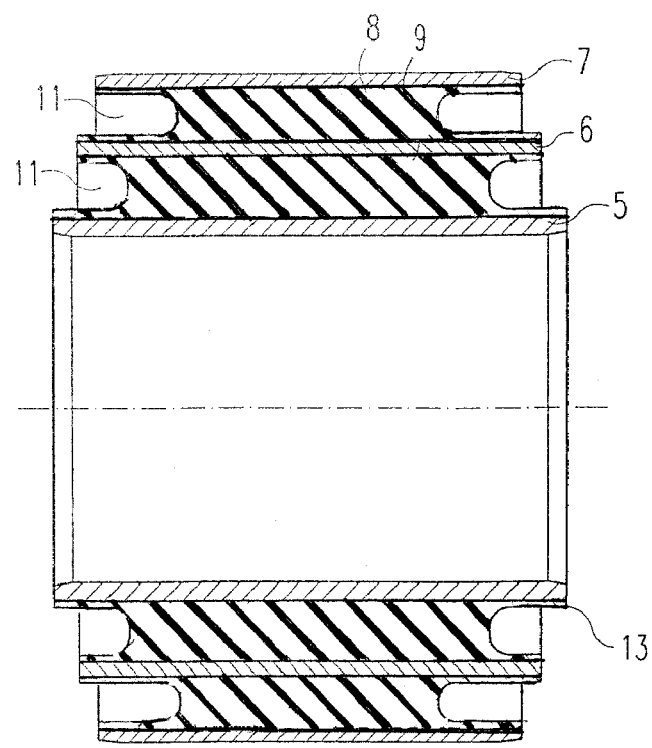
FIG. 2 is an axial cross sectional view of the housing according to the present invention of the first embodiment before the calibration.

Usual pipe sockets, usually ones made of steel, are used as cylinder sleeves 5, 6, 7. These are concentrically inserted into a casting mold and fixed. At about 80° C. and 200 bar, the elastic material (e.g., rubber), which is highly viscous or liquid in this state, is injected on the front side. The elastic material is distributed via the openings 12 of the middle cylinder sleeve 6 in the entire interior of the housing 13 due to the high pressure. The casting mold has annular openings 11 on the front sides. Such a housing 13 filled by casting is shown in FIG. 2.

After the casting, the cooled elastic material must be mechanically pretensioned to reach a desired elasticity characteristic of the housing 13 in the cold state. Such a pretension is achieved by compressing the outer cylinder sleeve 7 from the outside in a suitable device (for example, by means of pressing jaws) in the cold state, as a result of which the external diameter decreases by about 3 mm. The inner cylinder sleeve 5 is likewise widened in the cold state from the inside (for example, by means of spreading jaws or a mandrel), as a result of which the internal diameter is increased by about 2 mm. The elastic material in the interior of the housing is thus pressed, it yields partially laterally and fills the openings 11. However, the rubber is, as a whole, pretensioned, which defines the rigidity or the elasticity of the cylinder joint. The widening and/or compression of a cylinder sleeve 5, 7 is called "calibration" in this connection.

Figure 3A:
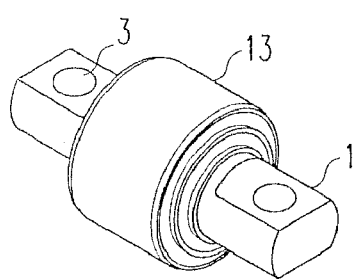
FIG. 3A is a perspective view of the first embodiment in the uninstalled state.
Figure 3B:
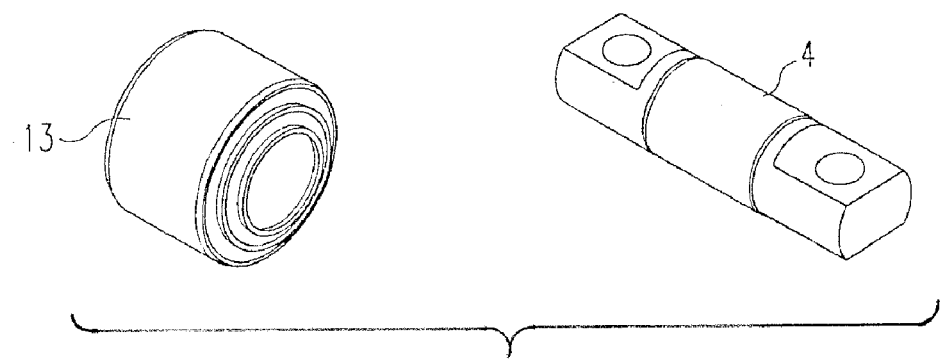
FIG. 3B is a perspective exploded view of the embodiment of FIG. 3A.
Figure 3C:
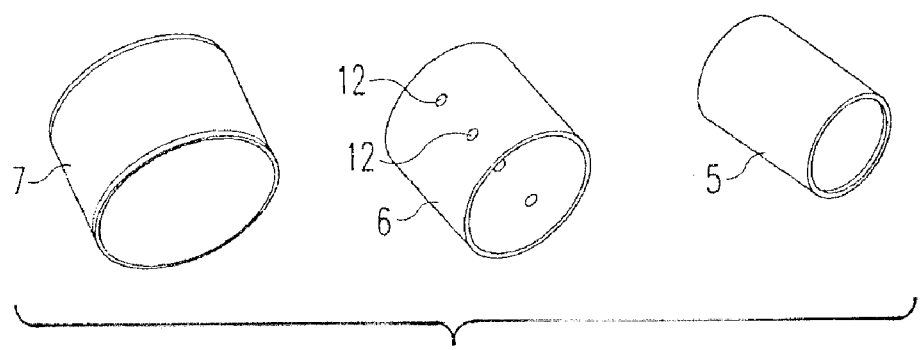
FIG. 3C is a perspective exploded view of the cylinder sleeves of FIG. 3B.

FIG. 3 shows an exploded view of the cylinder joint. The perspective view of the housing shows the staggered arrangement of the cylinder sleeves 5, 6, 7 inserted one into the other. The middle cylinder sleeve 6 has four holes 12 in FIG. 3. The number of holes may vary. Except for the surfaces 10 milled transversely to the holes, the cylinder piece can be clearly recognized as a rotationally symmetrical component (as a turned part in terms of manufacturing engineering). The length of the cylinder piece as well as the distance between the holes 3 can be varied independently from the housing 13. The housing 13 is the same for all cylinder pieces 1 in this embodiment. After the calibration of the housing 13, the cylinder piece 1 is pressed into the housing 13 with a fit and a defined pressing-in force. The pressing-in force is approx. 60 kN±10 kN(kilonewton).

Figure 4B:
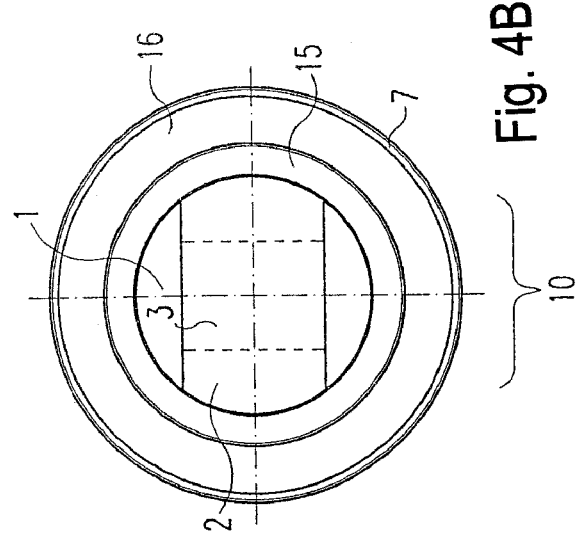
FIG. 4B is an axial view of the second embodiment of the joint according to the present invention in the uninstalled state.
Figure 4A:
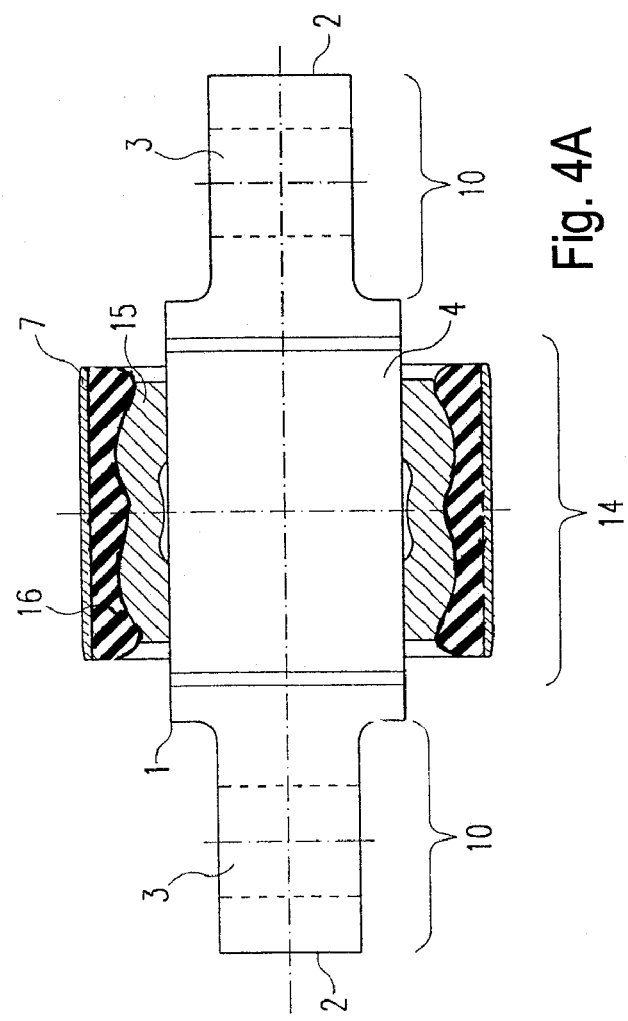
FIG. 4A is a transverse cross sectional view of a second embodiment of the joint according to the present invention in the uninstalled state.

FIG. 4A shows an cross sectional view with FIG. 4B showing an axial view of a second embodiment of the joint according to the present invention in the uninstalled state. The cylinder piece 1 is identical to the joint according to the first embodiment (i.e., according to the cylinder joint). The housing 14, into which the cylinder piece 1 is likewise pressed centrally in a suitable fit 4 (h9 fit/press fit), is again rotationally symmetrical. However, compared with the cylinder joint, the housing 14 of a joint according to this embodiment has only a single outer cylinder sleeve 7, which encloses a double ball sleeve 15 made of a thick material.

The space 16 between the cylinder sleeve 7 and the double ball sleeve 15 is filled with an elastic material (e.g., rubber). The double ball sleeve 15 has a thickness of several mm (approx. 6 mm) and has, in the form of double humps, two adjacent, outwardly directed spherical segment surfaces 17. The double ball sleeve 15 is a casting according to the present invention and does not need as such to have high-quality material properties, contrary to the forged half shell 24 of the joint according to the state of the art. For example, the use of spheroidal graphite cast iron, abbreviated as GGG-40.3, is meaningful.

As in the case of the cylinder joint, the outer cylinder sleeve 7 is pressed in the installed state into a bearing eye with the same fit and pressing-in force. The cardanic suspension of the cylinder piece 1 is brought about via the double ball sleeve 15 filled out with rubber, and the joint according to this second embodiment according to the present invention shall be called a "double ball and socket joint."

The manufacturing process is similar to that of the cylinder joint: The pipe socket representing the cylinder sleeve 7 and the cast double ball sleeve 15, which is machined on the front side and according to the fit on the inside, is concentrically introduced into a casting mold. The cavity 16 obtained, which has annular openings 11 on the front side because of the subsequent calibration, is filled with an elastic material (e.g., rubber) under the same conditions. A housing 14 manufactured in this manner is shown in FIG. 5 in the uncalibrated state. After cooling, only the cylinder sleeve 7 is calibrated and the rubber is thus pretensioned (the double ball sleeve 15 is too thick-walled to be able to be expanded on the inside).

Figure 6B:
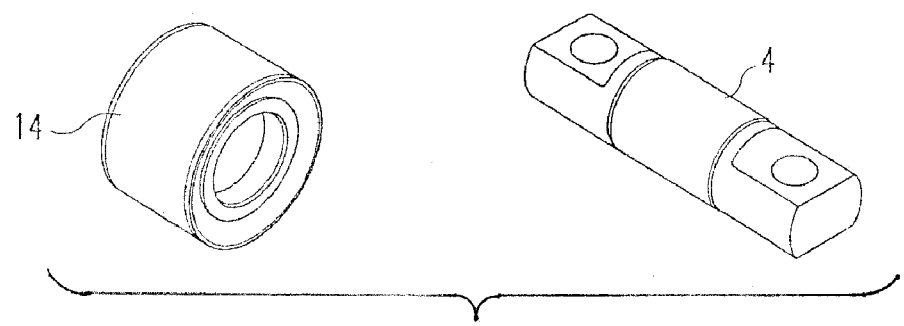
FIG. 6B is a perspective exploded view of the embodiment of FIG. 6A.
Figure 6C:
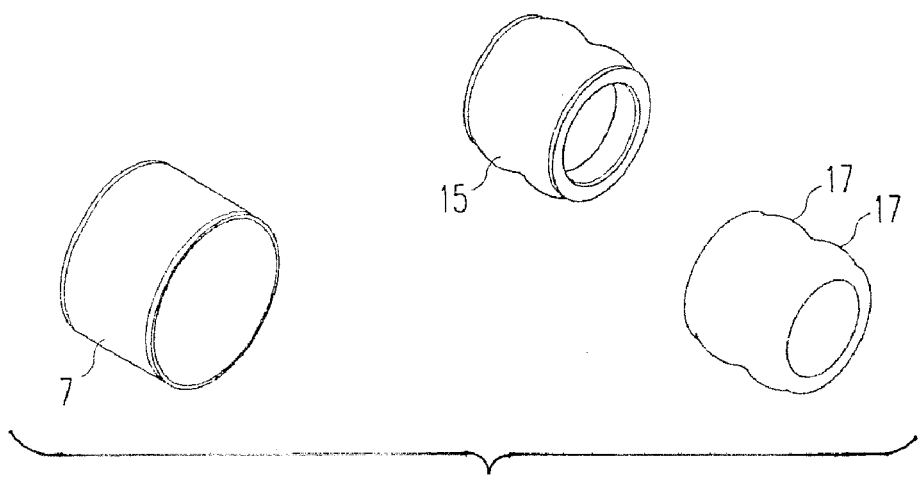
FIG. 6C is a perspective exploded view of the cylinder sleeves of FIG. 6B.

FIG. 6 shows an exploded view of the double ball and socket joint according to the present invention. Contrary to the cylinder joint, the housing 14 comprises only two parts (cylinder sleeve 7 and double ball sleeve 15), which are elastically connected by means of the rubber compound. However, the double ball sleeve 15 as a casting must be finished on the front side but mainly on the inside to ensure that the cylinder piece 1 can be fitted in accurately and in a nonpositive manner. The cylinder piece 1 itself is identical to that of the cylinder joint and can be manufactured, because of the construction of the two joints according to the present invention (cylinder joint and double ball and socket joint), only shortly before the mounting corresponding to the most current design dimensions.

Based on the different designs of the particular housings 13, 14 of the cylinder joint and the double ball and socket joint, the two joints have different cardanic properties and thus cover a broad field of use. The field of use is defined by kinematic and stationary forces of the parts to be coupled in the transverse, torsional as well as axial direction. The field of application can be expanded according to the present invention by manufacturing the housing 13, 14 with different diameters of the outer cylinder sleeve 7. The cylinder joint, in particular, may have more than three cylinder sleeves, whose radii can be additionally varied. A housing with a larger diameter of the outer cylinder sleeve 7 is expected to be able to be used under a higher load. What is thought of is especially different assembly units, i.e., housings 13, 14 with external diameters of 55 mm, 58 mm, 62 mm, 70 mm and 75 mm at a constant internal diameter of about 35 mm to 50 mm.

It can be stated, in general, that the present invention is characterized by the division of the claw 19, 24 and the ball piece 20 of a joint according to the state of the art into separate components. The claw 19, 24 is reduced to a simple cylinder piece 1; the ball piece 20 is taken up in a novel housing 13, 14 and its functionality is assumed and replaced by a housing 13, 14 of a novel design.

Such a ball and socket joint—especially for pneumatic suspensions in utility vehicles—is disclosed in EP 1 092 891 A2. In FIGS. 7 and 8, the ball and socket joint comprises two metallic halves (half shells) 24, which are laid flatly against one another with their flat sides and from which hemispherical or semi-ellipsoidal contours 20 are stamped out in a cap-like manner in mutually opposite directions. The combination of these two halves yields a so-called ball piece in the middle and so-called connection pieces 19 with holes 21 or grooves 22 for fixing the parts to be elastically connected by means of screw connections at the two ends. One of these two halves 24, also called a "claw," is shown in FIG. 8. The possibility of fastening mechanical parts to these halves 24 explains the term "claw" used for such a part. The ball piece is inserted according to FIG. 7 into a cylindrical housing 18 and is elastically connected with same via a joint made of an elastic material (rubber) 23, which was introduced by means of vulcanization. Both claws are rigidly connected with chassis and frame parts of the motor vehicle by means of the ends 19 of the two halves 24, which said ends jut out on both sides. Especially in case of the embodiment according to FIG. 7, the fastening is carried out by means of screws, which are introduced into the groove 22 shown. The housing or housings 18 is/are usually integrated in struts or (three-point, four-point, etc.) control arms, which elastically connect the corresponding chassis and frame parts.

While a specific embodiment of the invention has been shown and described in detail to illustrate the application of the principles of the invention, it will be understood that the invention may be embodied otherwise without departing from such principles.

What is claimed is:

1. A joint for the elastic mechanical connection of two machine parts, the joint comprising:
    a connection element having a middle area and two end areas, each to which one of the machine parts to be connected is fastened, said connection element being a rotationally symmetrical turned part;
    a housing, said connection element middle area being enclosed by said housing, said housing comprising at least two bushes which are concentrically inserted one into another, and which together define a hollow cylinder with an intermediate space; and
    elastic material filling said intermediate space, said connection element being enclosed by an innermost bush of said at least two bushes with said connection element cardanically, torsionally as well as radially and axially movable in relation to one or more of the other of said at least two bushes, wherein said at least two bushes include three bushes inserted concentrically one into another with each of said at least two bushes being cylindrical, said three bushes including said innermost bush, an intermediate bush, and an outer bush, said intermediate bush including openings, through which the elastic material, in said intermediate space between said innermost bush and said intermediate bush as well in said intermediate space between said intermediate bush and the outer bush, is connected.

2. A joint in accordance with claim 1, wherein the entire intermediate space between the innermost bush and the intermediate bush and between the intermediate bush and the outermost bush is filled with said elastic material.

3. A joint in for the elastic mechanical connection of two machine parts, the joint comprising:
    a connection element having a middle area and two end areas, each end area for fastening one of the machine parts to be connected, said connection element being a rotationally symmetrical turned part;
    a housing, said connection element middle area being enclosed by said housing, said housing comprising at least two bushes which are concentrically inserted one into another, and which together define a hollow cylinder with an intermediate space; and
    elastic material filling said intermediate space, said connection element being enclosed by an innermost of said at least two bushes with said connection element cardanically, torsionally as well as radially and axially movable in relation to one or more of the other of said at least two bushes, wherein the machine parts are fixed to said connection element via holes in the area of said connection element that is not enclosed.

4. A joint in accordance with claim 3, wherein in the area of said connection element which is not enclosed by said housing, said connection element is milled planarly transversely on both sides.

5. A joint for the elastic mechanical connection of two vehicle parts, the joint being formed by the steps comprising:
    forming a rotationally symmetrical connection element by turning, the connection element including a middle area and two end areas, each of said two end areas is fastened to one of the vehicle parts to be connected;
    inserting at least one bush into another with the bushes together defining a hollow cylinder with an intermediate space;
    filling said intermediate space with elastic material;
    calibrating said elastic material to a defined pretension trait by widening inner of said bushes and/or compressing outer of said bushes;
    enclosing at least a portion of the middle area of the connection element by an innermost of the bushes with said connection element cardanically, torsionally as well as radially and axially movable in relation to one or more of the other of the bushes; and
    providing another bush with the bushes being cylindrical and inserted concentrically one into another with an intermediate bush between said innermost and an outer bush, wherein said intermediate bush has openings providing communication from said intermediate space between said innermost bush and said intermediate bush to said intermediate space between said intermediate bush and said outer bush.

6. A joint, for the elastic mechanical connection of two machine parts, the joint comprising:
    a connection element having a middle area and two end areas, each end area for fastening one of the machine parts to be connected, said connection element being a rotationally symmetrical turned part;
    a housing, said connection element middle area being enclosed by said housing, said housing comprising at least two bushes which are concentrically inserted one into another, and which together define a hollow cylinder with an intermediate space; and
    elastic material filling said intermediate space, said connection element being enclosed by an innermost of said at least two bushes with said connection element cardanically, torsionally as well as radially and axially movable in relation to one or more of the other of said at least two bushes wherein said at least two bushes include three bushes inserted concentrically one into another with each of said three bushes being cylindrical and being made of metal and wherein an intermediate bush of said at least two bushes has openings, through which said intermediate space between said innermost bush and said intermediate bush as well as said intermediate space between said intermediate bush and an outer bush of said at least two bushes are connected.

7. A joint according to claim 6, wherein the connection element is in direct contact with and pressed into the innermost of said three bushes.

* * * * *